US007249252B2

(12) United States Patent
Hsieh (10) Patent No.: US 7,249,252 B2
(45) Date of Patent: Jul. 24, 2007

(54) METHOD OF REPLACING INITIALIZATION CODE IN A CONTROL STORE WITH MAIN CODE AFTER EXECUTION OF THE INITIALIZATION CODE HAS COMPLETED

(75) Inventor: Cheng-Hsueh A. Hsieh, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 370 days.

(21) Appl. No.: 10/869,757

(22) Filed: Jun. 16, 2004

(65) Prior Publication Data

US 2005/0283595 A1 Dec. 22, 2005

(51) Int. Cl.
*G06F 9/00* (2006.01)

(52) U.S. Cl. .............................. 713/1; 713/2; 713/100

(58) Field of Classification Search .................. 713/1, 713/2, 100
See application file for complete search history.

(56) References Cited

U.S. PATENT DOCUMENTS

| 5,146,458 | A | * | 9/1992 | Ono ........................... 714/719 |
| 5,173,903 | A | * | 12/1992 | Zelley et al. ................. 714/30 |
| 5,212,693 | A | * | 5/1993 | Chao et al. .................... 714/5 |
| 5,568,631 | A | * | 10/1996 | Webb .......................... 712/248 |
| 5,612,965 | A | * | 3/1997 | Michaelson ................. 714/800 |
| 5,892,900 | A | * | 4/1999 | Ginter et al. ................. 726/26 |
| 5,931,940 | A | * | 8/1999 | Shelton et al. ............. 712/204 |
| 6,434,676 | B1 | * | 8/2002 | Perloff ......................... 711/154 |
| 6,834,301 | B1 | * | 12/2004 | Hanchett .................... 709/223 |
| 6,883,166 | B1 | * | 4/2005 | Thompson .................. 717/161 |
| 2003/0005020 | A1 | * | 1/2003 | Wallman et al. ............... 709/1 |
| 2003/0128050 | A1 | * | 7/2003 | Schultz ........................ 326/41 |
| 2003/0221137 | A1 | * | 11/2003 | Brethour et al. ............ 713/400 |
| 2004/0015943 | A1 | * | 1/2004 | Chen .......................... 717/168 |
| 2004/0181772 | A1 | * | 9/2004 | Pensak et al. .............. 717/100 |
| 2005/0060626 | A1 | * | 3/2005 | Rajski et al. ............... 714/728 |

* cited by examiner

*Primary Examiner*—Thomas Lee
*Assistant Examiner*—Malcolm D Cribbs
(74) *Attorney, Agent, or Firm*—Fish & Richardson P.C.

(57) ABSTRACT

A method includes loading initialization code into a control store in an embedded microprocessor and executing the initialization code. The method determines if the execution of the initialization code is complete and replaces the initialization code in the control store with main code.

27 Claims, 6 Drawing Sheets

METHOD OF REPLACING INITIALIZATION CODE IN A CONTROL STORE WITH MAIN CODE AFTER EXECUTION OF THE INITIALIZATION CODE HAS COMPLETED

BACKGROUND

A network processor can include multiple embedded processors or engines. Each engine may be dedicated to a particular task and executes instructions to complete the task. Instructions used by the engine to execute a particular process or task are often stored in a control store.

DESCRIPTION

Figure 1:
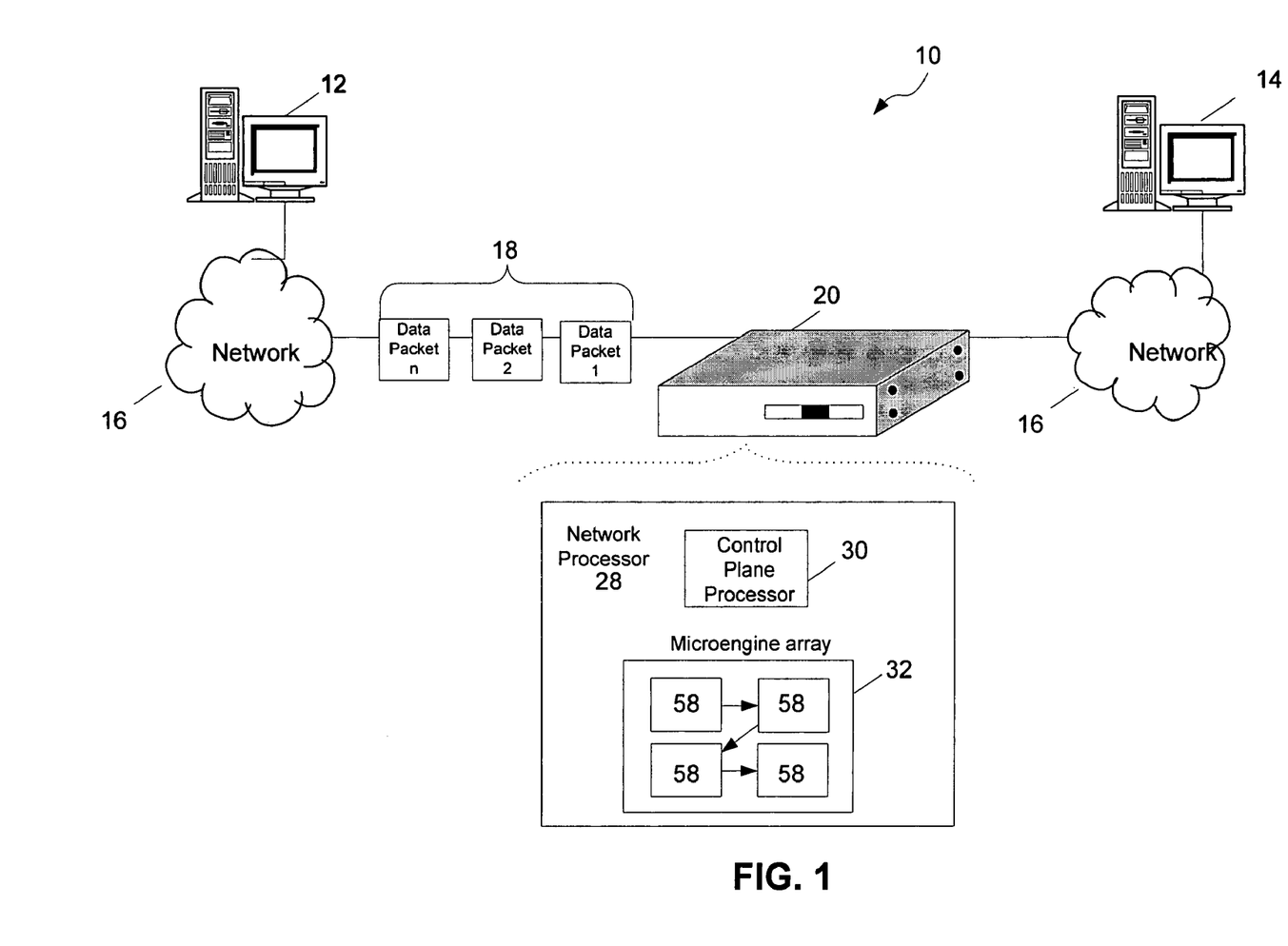
FIG. 1 is a block diagram of a system.
Figure 2:
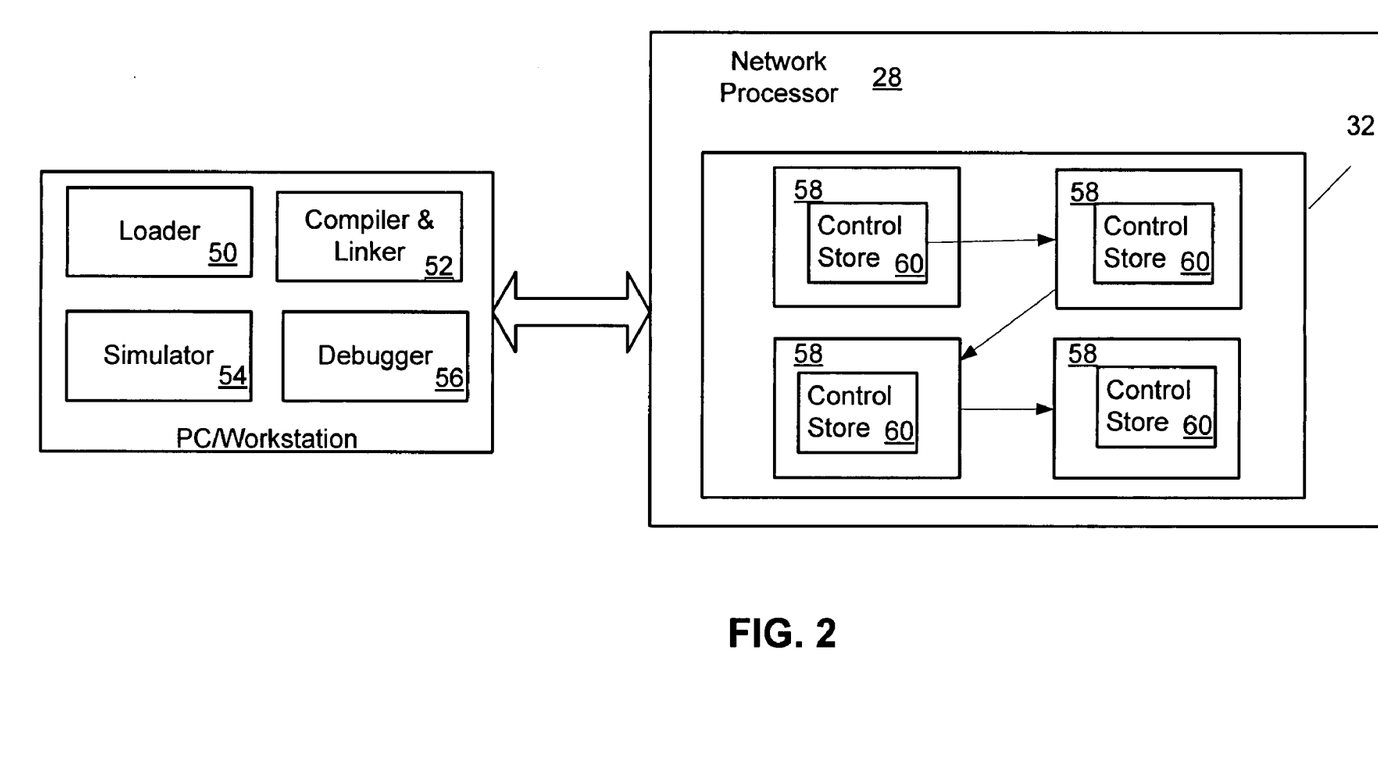
FIG. 2 is a block diagram of a network processor including multiple engines.

Referring to FIG. 1, a system 10 for transmitting data from a computer system 12 to another computer system 14 is shown. System 10 includes a networking device 20 (e.g., a router or switch) that collects a stream of "n" data packets 18 and classifies each of the data packets for transmission to the appropriate destination computer system 14. The networking device 20 includes a network processor 28 or other multi-core processor that processes the data packets 18 with an array 32 of, for example, four, (as illustrated in FIG. 2) or six or twelve, and so forth programmable multithreaded engines 58. An engine 58 can also be referred to as a processing element, an embedded processor, a processing engine, microengine, picoengine, and the like. Each engine executes instructions that are associated with a set of instructions (e.g., a reduced instruction set computer (RISC) architecture) and can be independently programmable. In general, the engines 58 and control plane processor 30 are implemented on a common semiconductor die, although other configurations are possible. The control plane processor 30 coordinates multiple data-plane processors or engines 58 and handles exceptions generated by the engines. The functionality of the control plane processor could be implemented in another type of processor such as a general purpose processor.

Referring to FIG. 2, the network processor 28 includes multiple engines 58 and each engine 58 includes a control store 60. The control store 60 stores application specific code and instructions accessed by the engine 58 to perform specific tasks. For example, control store 60 may include a set of instructions related to tasks required by an application such as packet classification, packet processing, and quality of service (QOS) actions. Such as set of instructions related to performing specific tasks determined by a programmer can be viewed as main code. The size of the control store 60 in the embedded microprocessor or engine 58 is limited. Thus, programs and instructions stored in the control store are generated to effectively utilize the space provided. Engine 58 can be single-threaded or multi-threaded (i.e., executes a number of threads). When an engine is multi-threaded, each thread acts independently as if there are multiple virtual engines.

The network processor interfaces and communicates with a PC, workstation, or other device that includes a loader 50, a compiler and linker 52, a simulator 54, and a debugger 56 that are used to load, execute, and debug programs stored in the control store 60. The loader 50, compiler and linker 52, simulator 54, and debugger 56 transmit code or data to the network processor 28. Programs executed by the engine 58 often include two components: an initialization routine (e.g., a compiled set of instructions from the initialization code) and a main routine (e.g., a compiled set of instructions from the main code). The initialization routine executes at start-up to initialize the engine 58, e.g., so that main code can be executed by the engine 58. Initialization code is generated by a high-level language compiler to initialize global and static variables, store constants in registers, initialize the software pipelining, and the like. The length of the initialization code may be substantial and, in some examples, the initialization code can be similar in length to the main code.

Figure 3:
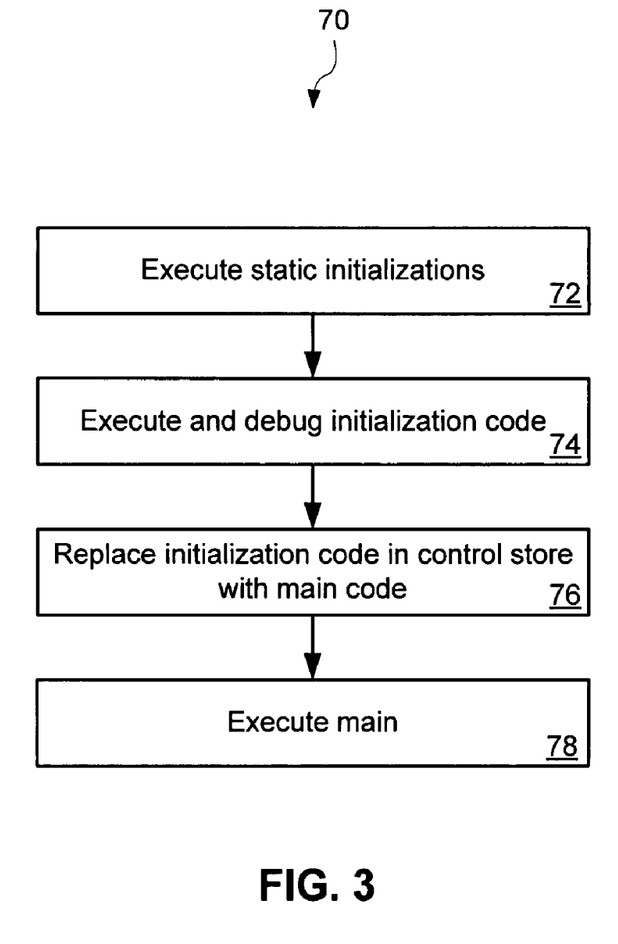
FIG. 3 is a flow chart of a process to initialize an engine and execute main code.

Referring to FIG. 3, a process 70 for executing initialization code and the main code using the limited storage in the control store 60 is shown. The initialization code (e.g, the compiled set of instructions resulting from the compiler compiling the initialization code) is not stored in the control store of the processor subsequent to execution (e.g., during execution of main code). This provides the advantage of allowing the main code (e.g, the compiled set of instructions resulting from the compiler compiling the main code) to use the entire space provided in the control store. The additional space allows more instructions or more complex code to be stored in the control store 60 for a given amount of control store storage space. In order to execute both the compiled initialization code and the compiled main code without storing the initialization code during execution of the main code, process 70 executes 72 static initializations for the system and executes and debugs 74 the initialization code. Process 70 replaces 76 the initialization code with the main code in the control store. The initializations set by the initialization code are maintained when the initialization code is overwritten. Process 70 subsequently executes 78 the main code.

Figure 4:
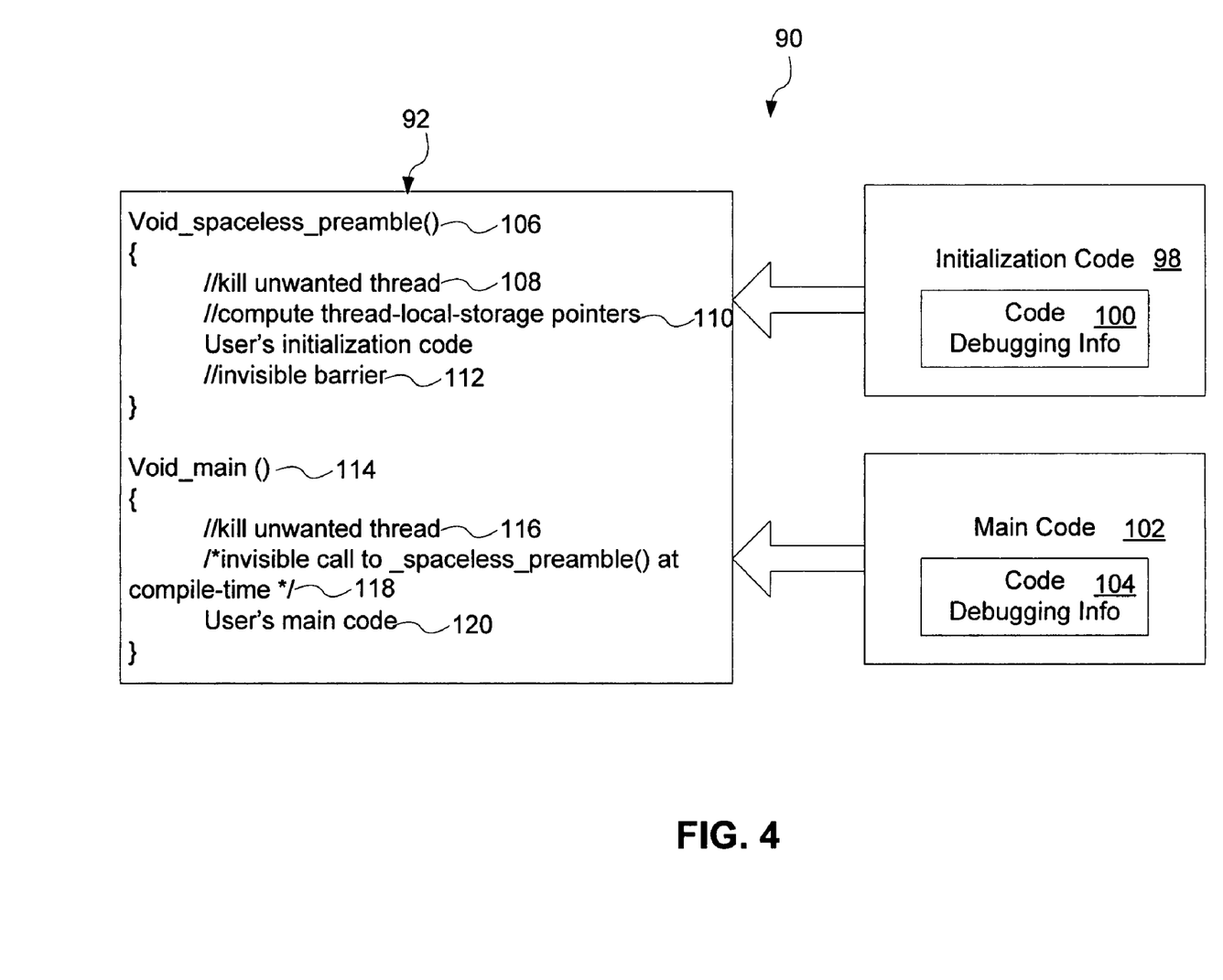
FIG. 4 is a block diagram of pseudo-code for an engine in the network processor.

Referring to FIG. 4, a program image including an initialization portion or code 98 and a main code 102 is shown. Both the initialization code 98 and the main code 102 include code-debugging information 100 and 104 respectively. The code debugging information is included in both portions because the debugger maintains a separate set of execution states (e.g., break points) for the initialization code 98 and the main code 102 (as described below).

The main code 102 includes an initial statement 116 to kill any unwanted threads. For example, in an 8 threaded engine, if a programmer elects to use only 4 threads instead of all 8, the compiler generates code to kill unwanted threads. If unwanted threads are not killed, unexpected behaviors may occur.

From the compiler's perspective, the main code 114 includes a call 118 to the initialization code 98. The compiler does not generate an explicit "call" instruction. Initialization code 98 is executed prior to the main code 102 as if there were a "call" from the main code to the initialization code from programmer's perspective based on the invisible call 118. In addition, the main code 102 also includes the code 120 or set of programmed instructions to cause an engine to perform a particular process or task.

The initialization code 98 (e.g., spaceless_preamble 106) is 'called' from the main code 102 for the purpose of compiler data-flow analysis. Spaceless_preamble is an arbitrary name given to the initialization code in this example. Other names could be used. The compiler does not generate a standard "call" and "return" sequence for the initialization code. This 'call' allows for use of a single execution of the initialization code 98. The initialization code 98 includes an initial statement 108 to kill any unwanted threads. Killing the unwanted threads ensures that the process begins execution with the correct state and ensures that and previously running processes are completed or terminated before the initialization process begins. The initialization code 98 includes an instruction 110 to compute thread pointers and a set of initialization instructions. Another statement 112 in the initialization code 98 is a barrier. The barrier is a statement replacing the typical "return" statement in the routine. The barrier indicates the end of the initialization process and is used to set a flag or provide an indication that the initialization is complete.

When the process reaches barrier 112, it kills any running threads. In order to replace the initialization code with the main code, the loader 50 needs to detect when all threads in initialization code finish execution. The loader 50 in control plane processor 30 detects when all threads are killed either by periodically querying the engine, or based on the engine sending an interrupt to the control plane processor 30. When the control plane processor 30 detects that all threads have been killed, the control plane processor removes the initialization code from the control store and replaces the initialization code with the main-code. Most of architecture states remain after the main code is written into the control store. Exceptions include resetting the program counter and reviving the threads. Other examples can include more or fewer exceptions to maintain the architectural state after execution of the initialization code.

The invisible barrier code 112 provides a synchronization point but differs from a return statement in a typical routine because a return statement indicates a location in the program to return to. Since the main code is not loaded in the control store during execution of the initialization code, a return statement would point to a nonexistent portion of the code (or an incorrect address). Based on the invisible barrier code 112 the loader makes sure that all threads executing the initialization routine reach the invisible barrier code 112 before overwriting the initialization code with the main code in the control store. The initialization code can execute on one or more thread.

The instructions included in the initialization code 98 are written by a programmer according to a set of rules. The compiler compiles the initialization code 98 and the main code 102 concurrently. Thus, the initialization code uses the same compilation options as the main code. The initialization code can communicate with the main code using global variables resulting in a single program image with two parts (e.g., the initialization code 98 and the main code 102). The initialization code executes after execution of any static initialization code but before any execution of any instructions in the main code. Thus, the initialization code does not rely on statements from the main code. Since the initialization code 98 is not stored in the control store during the execution of the main code 102, the initialization code cannot be called explicitly from functions in the main code (one exception is the invisible call to the initialization at compile time 118). For similar reasons, the initialization code cannot include calls to functions in the main code. Variables and state machines initialized by the initialization code are not reset before execution of the main code. Thus, any counters and state machines that are initialized for use in the initialization code, but are not correct for the main code are reset in either the initialization routine or the main code.

Figure 5:
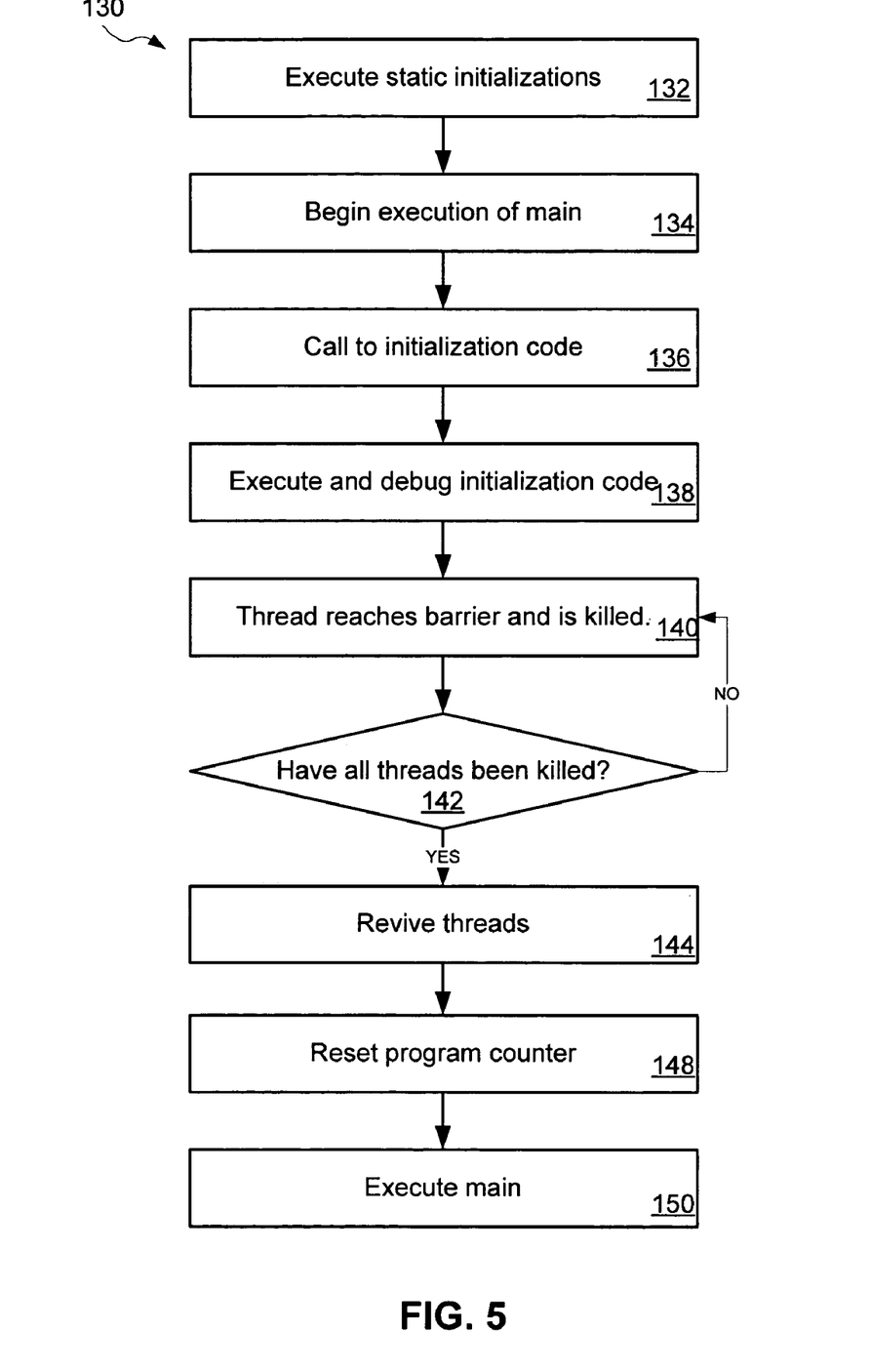
FIG. 5 is a flow chart of a process to execute initialization code and overwrite the initialization code with main code.

Referring to FIG. 5, a process 130 executed using the loader 50, compiler/linker 52, simulator 54, and debugger 56 is shown. Process 130 allows the initialization code 98 to execute a single time before the main code 102. Process 130 includes executing 132 the static initializations. The static initializations include initializing global and static variables and storing constants in registers. Subsequent to the execution of the static initializations, process 130 begins execution 134 of the main program. As described above, the main program 102 includes an implicit call 118 executed by the compiler in the initialization code or routine. Process 130 executes the call 136 to the initialization code and subsequently loads the initialization code into the control store, executes and debugs 138 the initialization code. Upon completion of the initialization process, threads reach a barrier and are killed 140. The initialization code can be executed on a single thread, on a subset of threads, or on all threads in the engine. The process checks 142 to see if all running threads have been killed. For example, a flag or bit can be set in a register when all threads have been killed and process 130 can check the register for a particular status. If process 130 determines 142 that the threads have not all been killed, process 130 returns to killing 140 the threads. If process 130 determines 142 that the threads have been killed, process 130 revives 144 the threads. Process 130 resets 148 the program counter and executes 150 the main code. Thus, the main code 102 is stored in the control store overwriting the initialization code 98 such that the initialization code 98 is not stored in the control store during the execution of the main code.

Figure 6:
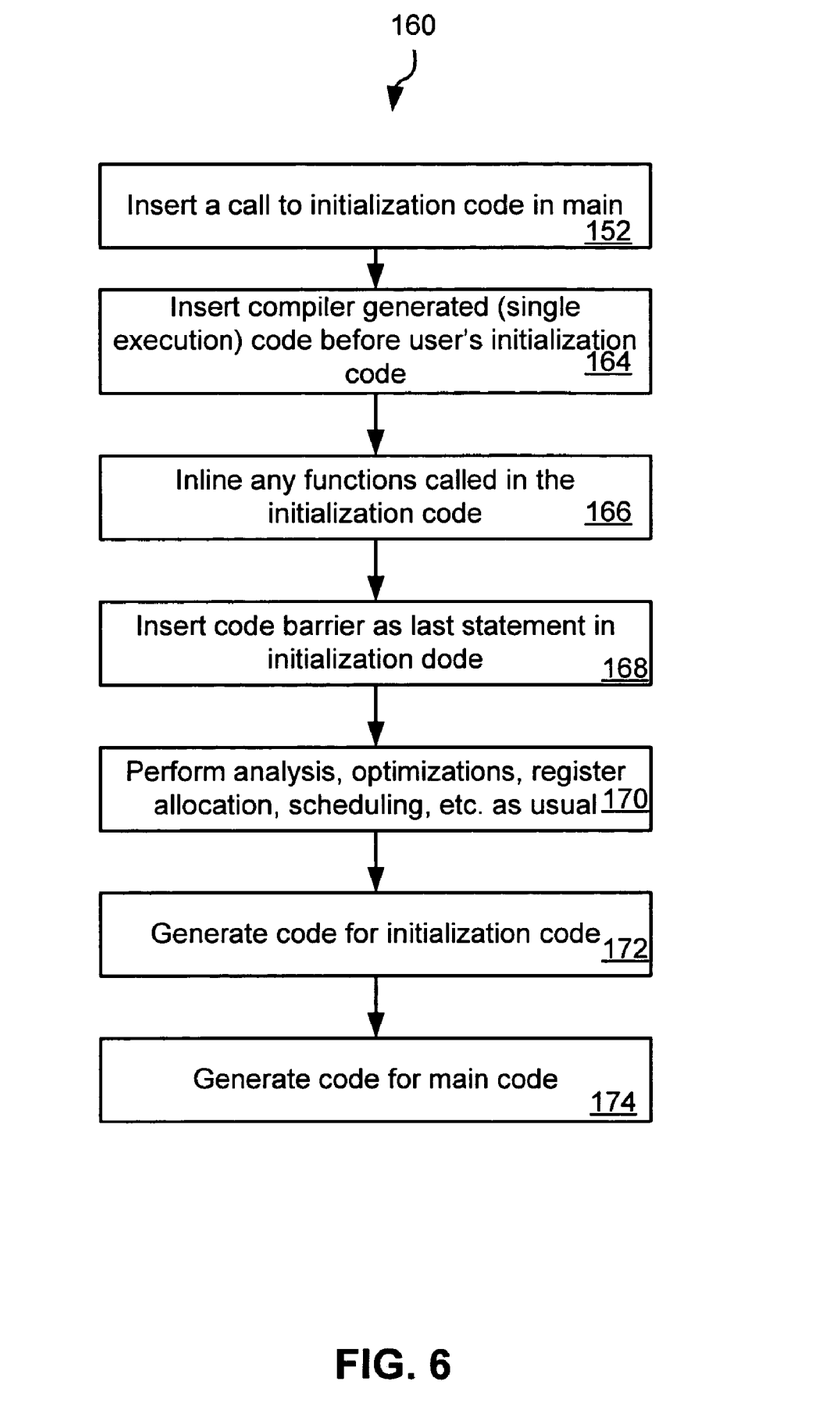
FIG. 6 is a flow chart of a compiler process.

Referring to FIG. 6, a process 160 executed by the compiler 52 during various portions of process 130 or in addition to process 130 is shown. This process allows the compiler to compile the initialization code 98 and allow the initialization code 98 to be overwritten with the main code 102 such that only the main code is stored in the control store of the engine. The compiler inserts 162 a call, e.g., call 118 to the initialization code in the main code. This call is inserted and executed as if it is the first statement in the main code (e.g., call 118 in FIG. 4) but is invisible not written by the programmer. The compiler inserts 164 compiler-generated code into the initialization code before the initialization code. Examples of the compiler-generated code include thread initialization code or a first iteration of a software pipelined loop.

The compiler inserts 166 the actual code for (also referred to an inlining) any functions called in the initialization code. Alternatively, the compiler may replace the call to the function with the code for the function only for functions also called from the main code. The code for functions replaces the call to the function for a variety of reasons. For example, if a function is called from both the main code and the initialization code the addresses, compilation, or debugging of the function might be different when executed in the main code than when executed in initialization code. If the calls to the functions are not replaced by the actual code, but are called from both the main code and the initialization code, the main code analysis and optimizations may be inefficient or incorrect because the non-existence of the call site from the initialization code.

The compiler also inserts 168 a code barrier as the last statement in the initialization code. The code barrier replaces the typical 'return' statement and when reached the barrier kills all threads running (as described above). The engine revives the threads before the execution of the main code.

The compiler also performs 170 analyses, optimizations, register allocation, scheduling, and the like as if the initialization code were stored in the control store with the main code. The analyses, optimizations, register allocation, and scheduling are performed such that a control-flow-graph is generated and global variables are initialized and stored after the initialization code.

The compiler also generates 172 and 174 code used in the initialization function and the main function. For the initialization function, the compiler generates code to kill unwanted threads in the initialization function according to compilation options. The compiler explicitly kills undesired threads because the threads are enabled to run after the embedded microprocessor is reset. The compiler also generates debugging information for the initialization code (as described below). The code generation for the main function includes generating code to kill unwanted threads. This code is included in both the initialization code and the main code because threads are killed in the barrier and revived before the main function is executed. Any unwanted threads are killed at the beginning of the main function. The compiler generates code to kill unwanted threads in main-code because all threads are revived after main-code replaces the initialization code in the control store. Finally, the compiler generates the main code starting from program counter of "0" (or another predetermined start point) and generates debugging information. The compiled main code overwrites the initialization code in the control store.

In order for the main code to operate appropriately after overwriting the initialization code 98, the debugger 56 maintains separate execution states (e.g., breakpoints) for the initialization code 98 and the main code 102. As described above, functions called from both the main code 102 and the initialization code 98 are inlined (e.g., the code for the function replaces the call to the function) in the initialization code 98. Thus, the debugger associates the source-level breakpoints set inside the function to an appropriate program counter depending on whether the initialization code or the main code is currently running (e.g., the breakpoints depend on the code currently executing and does not cause breakpoints to be set at the program counter in each execution). In order to set the program counter dependent on the currently executing function (e.g., initialization or main), a state, which indicates which code (i.e. main or initialization) is currently running is generated by the loader 50.

In another example, the debugging is disabled during the initialization code. In this example, a programmer debugs the initialization code in a previous debug session and moves the debugged code into the initialization routing after debugging.

A number of embodiments have been described, however, it will be understood that various modifications may be made. Accordingly, other embodiments are within the scope of the following claims.

What is claimed is:

1. A method comprising:
   loading initialization code into a control store in an embedded processor, the embedded processor in an array of embedded processors in a multi-core processor;
   executing the initialization code, the initialization code comprising instructions to initialize the embedded processor;
   determining if the execution of the initialization code is complete; and
   replacing the initialization code in the control store of the embedded processor with main code after the execution of the initialization code is complete, the main code comprising instructions related to tasks to be performed by the embedded processor after initialization of the embedded processor.

2. The method of claim 1 wherein replacing the initialization code includes overwriting the initialization code.

3. The method of claim 1 wherein replacing the initialization code includes:
   clearing the control store; and
   writing the main code into the control store.

4. The method of claim 1 further comprising resetting a program counter before executing the main code.

5. The method of claim 1 further comprising maintaining separate execution states for the initialization code and the main code.

6. The method of claim 1 further comprising:
   killing all threads of the embedded microprocessor subsequent to determining that the initialization is complete; and
   reviving all threads of the embedded microprocessor prior to executing the main code.

7. The method of claim 1 wherein the initialization code is not called from functions included in the main code.

8. The method of claim 1 further comprising concurrently compiling the initialization code and the main code.

9. The method of claim 1 further comprising calling the initialization code from the main code and removing the call from the main code after execution of the initialization code is complete.

10. A system comprising:
    an engine, the engine in an array of engines in a multi-core processor;
    a compiler; and
    a loader, the compiler and loader located separately from the engine, wherein the compiler and loader are configured to:
    load an initialization routine into a control store of the engine, the initialization routine comprising instructions to initialize the engine;
    upon completion of the initialization routine replace the initialization code in the control store of the engine with a main routine, the main code comprising instructions related to tasks to be performed by the engine after initialization of the engine.

11. The system of claim 10 wherein the loader and compiler are further configured to inactivate at least some threads subsequent to the determined completion of the initialization routine.

12. The system of claim 11 wherein the compiler and loader are further configured to revive the threads.

13. A computer program product, tangibly embodied in an information carrier, for executing instructions on a processor, the computer program product being operable to cause a machine to:
    load initialization code into a control store in an embedded microprocessor, the embedded processor in an array of embedded processors in a multi-core processor;
    execute the initialization code, the initialization code comprising instructions to initialize the embedded processor;
    determine if the execution of the initialization code is complete; and replace the initialization code in the control store of the embedded processor with main code after the execution of the initialization code is complete, the main code comprising instructions related to tasks to be performed by the embedded processor after initialization of the embedded processor.

14. The computer program product of claim 13 wherein the instructions to cause a machine to replace the initialization code include instructions to cause a machine to overwrite the initialization code.

15. The computer program product of claim 13 wherein the instructions to cause a machine to replace the initialization code include instructions to cause a machine to: clear the control store; and
write the main code into the control store.

16. The computer program product of claim 13 further comprising instructions to cause a machine to reset a program counter before executing the main code.

17. The computer program product of claim 13 further comprising instructions to cause a machine to maintain separate execution states for the initialization code and the main code.

18. The computer program product of claim 13 further comprising instructions to cause a machine to:
kill all threads of the embedded microprocessor subsequent to determining that the initialization is complete; and
revive all threads of the embedded microprocessor prior to executing the main code.

19. A router comprising:
a backplane; and
a processor, the processor including:
a plurality of engines; and
a loader located separately from the engines, wherein the loader is configured to:
load an initialization routine into a control store of the engines;
executing the initialization routine, the initialization routine comprising instructions to initialize the engine;
determine completion of the initialization routine; and
overwrite the initialization routine in the control store of the engine with a main routine after the execution of the initialization routine is complete, the main routine comprising instructions related to tasks to be performed by the engine after initialization of the engine.

20. The system of claim 19 wherein the loader is further configured to kill all threads subsequent to the determine completion of the initialization routine.

21. The system of claim 19 wherein the loader is further configured to revive the threads.

22. An arrangement configured to:
concurrently compile an initialization code and a main code to generate compiled initialization instructions and compiled main instructions;
load the compiled initialization instructions into a control store in an embedded microprocessor, the embedded microprocessor in an array of embedded processors in a multi-core processor;
determine if the execution of the compiled initialization instructions is complete; and
replace the compiled initialization instructions in the control store of the embedded microprocessor with the compiled main instructions after the execution of the initialization instructions is complete, the main instructions comprising instructions related to tasks to be performed by the embedded microprocessor after initialization of the embedded processor.

23. The arrangement of claim 22 further configured to reset a program counter before executing the main code.

24. The arrangement of claim 22 further configured to maintain separate execution states for the initialization code and the main code.

25. The arrangement of claim 22 further configured to insert a call in the main code to the initialization code and remove the call from the main code after execution of the initialization code is complete.

26. The arrangement of claim 22 wherein the arrangement includes a compiler.

27. The arrangement of claim 22 wherein the arrangement includes a loader.

* * * * *